May 25, 1965 C. A. SWENSON 3,184,993
DERAILLEUR GUARD
Filed Dec. 11, 1963
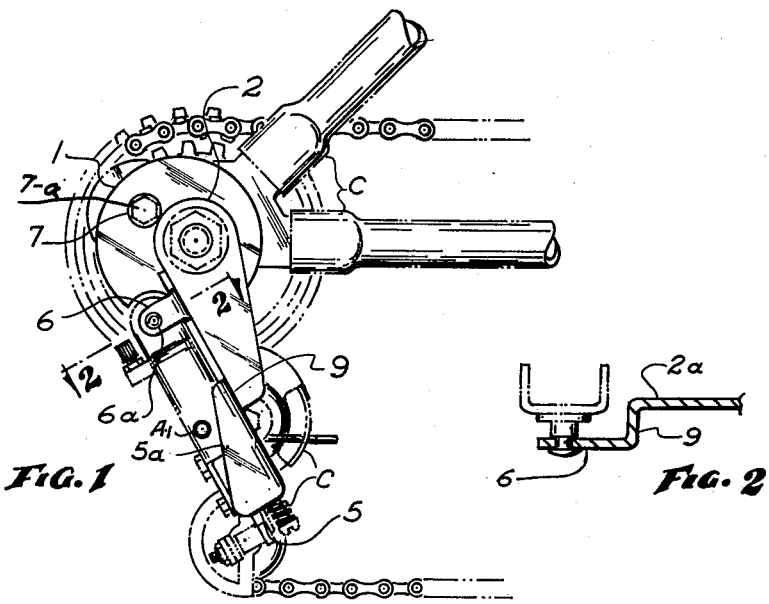
INVENTOR.
CARL A. SWENSON
BY
AGENT United States Patent Office 3,184,993
Patented May 25, 1965

3,184,993
DERAILLEUR GUARD
Carl A. Swenson, 615 N. Berlyn Ave., Ontario, Calif.
Filed Dec. 11, 1963, Ser. No. 329,831
6 Claims. (Cl. 74—611)

The present invention relates to a guard for a multiple change-speed gear for bicycles, the particular type thereof being referred to in the trade as "Derailleur," hence the guard member of the invention is known as a "Derailleur" guard.

Because of the elongate and rather slenderized construction of the multiple change-speed gear unit, it is easily bent at the point of attachment to the frame and rear axle. Since the alignment of the chain guide wheels of the change-speed unit is critical in order to allow proper tracking of the chain around the rear sprockets, any bending of the change-speed unit at the point of attachment to the rear axle and bicycle frame results in extensive damage to the said unit and considerable expense in the repair or even replacement thereof.

Due to this problem which has arisen in connection with the Derailleur type of change-speed unit, there has been an attempt to provide a guard member outside of the same to prevent bending of the change-speed unit at this point of attachment as above indicated. This guard serves to protect the change-speed unit from damage due to being struck from the outside or bent when the bicycle is laid on its side.

Thus far these guards have been designed in such a manner as to result in a massive or heavy appearance when installed on the bicycle. Inasmuch as the slenderized and light weight design is an important factor in the style of bicycle on which the multiple change-speed is used, it is essential to retain the slender or light weight features in the guard member that is used in connection with the change-speed unit. This, of course, entails certain improvements in the means of attachment of the said guard and a particular insert member that is placed between the guard and the frame and rear axle of the bicycle.

The dominant feature of the present invention therefore resides in the provision of a change-speed gear guard that is sufficiently strong to protect the said change-speed unit and yet to retain the slender lines and appearance that is so important in the light weight design of the sporting type of bicycle.

The invention will be more fully understood by reference to the following detailed description, and the accompanying drawings, in which:

FIG. 1 is a side elevational view of the guard member and the reinforcing insert as the same appears when in use, the adjacent portions of the sprocket and frame being fragmentarily shown in broken lines.

FIG. 2 is a cross section taken on the line 2—2 of FIG. 1.

FIG. 3 is an exploded view of the assembly of the guard member and the reinforcement insert shown in full lines in relation to the change-speed unit and attaching means illustrated by broken lines.

FIG. 4 is a section taken on line 4—4 of FIG. 3.

FIG. 5 is a side perspective view of this guard member; and

FIG. 6 is a side perspective view of the reinforcing insert member.

Referring now to the drawings, 1 denotes the reinforcing insert member that is used in combination with the Derailleur guard 2 as a strengthening means in the rear hub assembly; being fitted by the opening 8 to the rear axle B and over the nut 7–a of the frame connecting element B–1. FIG. 1 shows the nut 7–a snugly inserted in the circular opening 7 of the reinforcing member 1.

The reentrant portion 4 of the member 1 is cut away to accommodate the upper end of the Derailleur unit A shown in FIG. 3.

As to the Derailleur guard member 2 shown in FIG. 5, and which comprises the dominant feature of the present invention, it will be noted that it is fitted by means of circular opening 6–b being placed over the outer end of axle B and anchored in place by the opening 6–a in lug 6 being secured at the end of pin A–2 of the Derailleur unit shown in group A of FIG. 3.

FIG. 3 shows the arrangement of the respective parts in the assembly of the Derailleur change-speed unit with the Derailleur guard 2 and reinforcing insert member 1 installed. This figure shows the rear axle B, coupling link B–1 for joining the upper end of the Derailleur to the lower end thereof, and securing the upper end of said link to the axle and bicycle frame portion, A representing the Derailleur unit per se, while the reinforcing insert 1, and the guard member 2 are shown by means of full lines; the other parts in FIG. 3 being shown by broken lines, B–2 and B–3 illustrate the washer and nut at the outer end of the axle.

Referring now to FIGS. 2, 4 and 5, showing the guard member, it will be noted that the portion 3 is parallelogram shaped, having a rearwardly bent triangular portion 5–a disposed normally to the said portion 3, and an elongate oval portion forwardly bent from the opposite side of the parallelogram shaped portion 3, and disposed normally thereto. Near the upper portion of the oblique side of the portion 3 and rearwardly bent therefrom is a lug 6 for attachment of the Derailleur unit.

It will be noted that the portion 3 of the guard faces toward the front and therefore protects the Derailleur from foreign material that may be thrown rearwardly while the bicycle is in motion. The rearwardly bent triangular deflector portion 5–a having the shorter side 5 at the bottom affords the maximum protection where it is needed most, while side 5–a being angled inwardly toward the body portion 3, allows access to the adjustment screw A–1 without removal of the guard 2.

The upper wing 2–a is so shaped as to adapt the same to be mounted on the outer end of the rear axle B and held in place by the washer B–2 and nut B–3. The width of the upper end of portion 2–a allows a proper combination with the reinforcing insert 1 so that the proper amount of rigidity is provided so that there is no danger of lateral bending of the guard member. The lug 6 is used to reinforce the point of suspension of the Derailleur at the upper end thereof.

Thus it is seen that the problem of preventing damage to the Derailleur unit, without designing a heavy appearing plate on the outside of the same is accomplished in such a manner as to retain the light weight design and appearance and yet retaining the strength factors of the guard.

Also the use of the reinforcing insert 1 blends in with the related portions at the upper end of the guard, and in addition thereto provides greater strength in the attachment of the guard unit and provides additional support at the point of attachment of the Derailleur at the upper end thereof.

While I have described what is regarded as the preferred embodiment of the invention, it is to be understood that changes and developments may be made, when desired, as they fall within the scope of the following claims:

What I claim is:

1. In a guard for a bicycle change-speed unit of the Derailleur type, a parallelogram shaped mid-portion, a rearwardly bent portion extending from the lower vertical side of the said parallelogram shaped portion, being disposed normally thereto and formed integrally therevith, a forwardly bent portion extending from the upper vertical side of the said parallelogram shaped mid-portion, being disposed normally thereto and formed integrally therewith, a relatively small lug being bent rearwardly from the said parallelogram shaped mid-portion at a point adjacent the upper end of the upper oblique side thereof, the said lug being disposed normally thereto and formed integrally therewith.

2. In a guard for a bicycle change-speed unit of the Derailleur type, a parallelogram shaped mid-portion, a triangular shaped rearwardly bent portion extending from the lower vertical side of the said parallelogram shaped portion, being disposed normally thereto and formed integrally therewith, an elongate oval shaped forwardly bent portion extending from the upper vertical side of the parallelogram shaped mid-portion, being disposed normally thereto and formed integrally therewith, a relatively small lug being bent rearwardly from the said parallelogram shaped midportion at a point adjacent the upper end of the upper oblique side thereof, the said lug being disposed normally thereto and formed integrally therewith.

3. In a guard for a bicycle change-speed unit of the Derailleur type, a parallelogram shaped mid-portion, a triangular shaped rearwardly bent portion extending from the lower vertical side of the said parallelogram shaped portion, being disposed normally thereto and formed integrally therewith, an elongate oval shaped forwardly bent portion extending from the upper vertical side of the parallelogram shaped mid-portion, being disposed normally thereto and formed integrally therewith, a relatively small lug being bent rearwardly from the said parallelogram shaped mid-portion at a point adjacent the upper end of the upper oblique side thereof, the said lug being disposed normally thereto and formed integrally therewith, the said lug being adapted to serve as a support for the said bicycle change-speed unit.

4. In a guard for a bicycle change-speed unit of the Derailleur type, a parallelogram shaped mid-portion, a triangular shaped rearwardly bent portion extending from the lower vertical side of the said parallelogram shaped portion, being disposed normally thereto and formed integrally therewith, an elongate oval shaped forwardly bent portion extending from the upper vertical side of the parallelogram shaped mid-portion, being disposed normally thereto and formed integrally therewith, the larger upper end of the said elongate oval shaped portion extending above the upper end of the said parallelogram shaped portion, a relatively small lug being bent rearwardly from the said parallelogram shaped mid-portion at a point adjacent the upper end of the upper oblique side thereof, the said lug being disposed normally thereto and formed integrally therewith, the said lug being adapted to serve as a support for the said bicycle change-speed unit.

5. A guard for a bicycle change-speed unit of the Derailleur type as claimed in claim 1 in combination with a relatively thin circular insert member having an arcuate reentrant portion therein, a pair of circular openings in the body portion, thereof, said circular openings being adapted to be secured to the bicycle hub axle and a bolt extending from a bicycle frame portion respectively, the said arcuate reentrant portion being adapted to conform to the upper end of the said change-speed unit.

6. A guard for a bicycle change-speed unit of the Derailleur type as claimed in claim 4 in combination with a relatively thin circular insert member having an arcuate reentrant portion therein, a pair of circular openings in the body portion thereof, said circular openings being adapted to be secured to the bicycle hub axle and a bolt extending from a bicycle frame portion respectively, the said arcuate reentrant portion being adapted to conform to the upper end of the said change-speed unit.

References Cited by the Examiner

UNITED STATES PATENTS

| | | | |
|---|---|---|---|
| 947,651 | 1/10 | Schreiber | 74—611 X |
| 1,636,327 | 7/27 | Roe | 74—611 |
| 2,618,980 | 11/52 | Cook et al. | 74—611 X |
| 2,773,398 | 12/56 | Swain | 74—611 X |

FOREIGN PATENTS

| | | |
|---|---|---|
| 1,204,027 | 8/59 | France. |
| 941,235 | 11/63 | Great Britain. |

DON A. WAITE, *Primary Examiner.*